(12) United States Patent
Ozawa et al.

(10) Patent No.: US 11,794,654 B2
(45) Date of Patent: Oct. 24, 2023

(54) ELECTRONIC MIRROR SYSTEM, AUTOMOBILE DOOR, AND AUTOMOBILE

(71) Applicant: TS TECH CO., LTD., Asaka (JP)

(72) Inventors: Hidetoshi Ozawa, Shioya-gun (JP); Takayoshi Ito, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 17/348,175

(22) Filed: Jun. 15, 2021

(65) Prior Publication Data

US 2021/0370837 A1 Dec. 2, 2021

Related U.S. Application Data

(63) Continuation of application No. 16/499,680, filed as application No. PCT/JP2017/034244 on Sep. 22, 2017, now Pat. No. 11,034,302.

(30) Foreign Application Priority Data

Mar. 29, 2017 (JP) ................................. 2017-064816

(51) Int. Cl.
*B60R 1/12* (2006.01)
*B60R 11/00* (2006.01)

(52) U.S. Cl.
CPC ........ *B60R 1/12* (2013.01); *B60R 2001/1253* (2013.01); *B60R 2300/602* (2013.01)

(58) Field of Classification Search
None
See application file for complete search history.

(56) References Cited

U.S. PATENT DOCUMENTS

| 6,746,065 | B1 | 6/2004 | Chan |
| 10,116,873 | B1 | 10/2018 | Campbell |
| 10,239,456 | B1 | 3/2019 | Tao et al. |
| 2002/0048102 | A1 | 4/2002 | Lang et al. |
| 2010/0053327 | A1* | 3/2010 | Nakayama ............... B60R 1/00 |
| | | | 348/148 |

(Continued)

FOREIGN PATENT DOCUMENTS

| JP | H07-223487 A | 8/1995 |
| JP | 3131966 U | 5/2007 |

(Continued)

OTHER PUBLICATIONS

Nov. 28, 2017 International Search Report issued in International Application No. PCT/JP2017/034244.

(Continued)

*Primary Examiner* — Christopher Braniff
(74) *Attorney, Agent, or Firm* — Oliff PLC

(57) ABSTRACT

An electronic mirror system includes, a camera which can be attached to a side of an automobile and which is able to image a moving image diagonally behind the automobile; and a monitor apparatus which can be attached in the passenger compartment of the automobile and which can display the moving image imaged by the camera. The monitor apparatus includes a movable portion which can move the display which displays the moving image with relation to a wall to where the monitor apparatus is attached in the passenger compartment.

9 Claims, 8 Drawing Sheets

(56) References Cited

U.S. PATENT DOCUMENTS

| | | | |
|---|---|---|---|
| 2016/0193924 A1* | 7/2016 | Kim | G06F 1/1601 |
| | | | 296/70 |
| 2018/0118031 A1* | 5/2018 | Crijns | G09G 5/14 |
| 2018/0164831 A1* | 6/2018 | Han | B60R 11/04 |

FOREIGN PATENT DOCUMENTS

| | | |
|---|---|---|
| JP | 2008-534374 A | 8/2008 |
| JP | 2009-269535 A | 11/2009 |
| JP | 2010-116125 A | 5/2010 |
| JP | 2011-5972 A | 1/2011 |

OTHER PUBLICATIONS

Hidenao, Kume, "Mirroless Cars Appear More and More", Nikkei Business, pp. 90-93, 2016.
Oct. 1, 2019 International Preliminary Report on Patentability issued in International Patent Application No. PCT/JP2017/034244.
Sep. 23, 2020 Office Action issued in Japanese Patent Application No. 2017-064816.

* cited by examiner

ELECTRONIC MIRROR SYSTEM, AUTOMOBILE DOOR, AND AUTOMOBILE

CROSS-REFERENCE

This is a Continuation of U.S. application Ser. No. 16/499,680, filed Sep. 30, 2019, which is a National Stage Entry of PCT/JP2017/034244, filed Sep. 22, 2017, and claims priority to Japanese Patent Application No. 2017-064816, filed Mar. 29, 2017. The entire contents of the above applications are expressly incorporated by reference herein.

TECHNICAL FIELD

The present invention relates to an electronic mirror system, an automobile door including the electronic mirror system, and an automobile including the electronic mirror system.

BACKGROUND ART

Lately, in the field of automobiles, there is an attempt to use an apparatus called electronic mirrors instead of side view mirrors. Such electronic mirror includes a camera which is attached to a side of a vehicle body to image behind the vehicle and a monitor which is provided in a passenger compartment to show the moving image imaged by the camera.

By using such electronic mirror there are expectations to achieve various effects such as improving the visibility behind the vehicle, enhancing freedom in designing the vehicle, improving efficiency in fuel consumption due to decrease in air resistance, and the like.

CITATION LIST

Patent Literature

Non-Patent Document 1: "Mirrorless Cars Appear More and More" Hidenao KUME, Nikkei Business, Oct. 3, 2016 Edition, p. 90 to p. 93, Nikkei BP

SUMMARY OF INVENTION

Technical Problem

However, the position near where the side view mirror is conventionally attached in the front and the side of the passenger compartment is a window due to the necessity of viewing the side view mirror. Since it is difficult to attach a monitor to a window glass, if the monitor is attached to the automobile with the present structure, the monitor is attached to the position lower than the conventional side view mirror such as door lining or an instrument panel.

However, the passenger needs to look down to the monitor diagonally and the monitor becomes difficult to view. Especially if the display is a liquid crystal display, the screen becomes dark when viewed diagonally.

Moreover, if the line of sight is turned away from the window while driving, the amount of time that the driver cannot look forward increases, and increasing the vertical movement of the eyes applies excessive stress to the driver's eyes.

The present invention is conceived in view of the above problems, and the purpose of the present invention is to overcome defects which occur by providing a monitor in a position lower than a conventional side view mirror in an electronic mirror system provided in an automobile.

Solution to Problem

In order to solve the above problem, according to aspect 1 of the present invention, an electronic mirror system includes: a camera which can be attached to a side of an automobile and which is able to image a moving image diagonally behind the automobile; and a monitor apparatus which can be attached in the passenger compartment of the automobile and which can display the moving image imaged by the camera, wherein the monitor apparatus includes a movable portion which can move the display which displays the moving image with relation to a wall to where the monitor apparatus is attached in the passenger compartment.

According to aspect 2 of the present invention, in the electronic mirror system according to aspect 1, the movable portion includes a lift which is provided between an attaching portion attached to the wall and the display and which can raise and lower the display.

According to aspect 3 of the present invention, in the electronic mirror system according to aspect 2, the lift is provided between a side of the passenger compartment in a left and right direction and an edge of the display toward the side of the passenger compartment in the left and right direction.

According to aspect 4 of the present invention, in the electronic mirror system according to any one of aspects 1 to 3, the movable portion includes an angle adjuster which can change an angle of a display surface of the display with relation to the movable portion.

According to aspect 5 of the present invention, in the electronic mirror system according to any one of aspects 1 to 3, the movable portion includes a rotator which is able to rotate the display with a rotating axis extending in a direction along a surface of a component attached to the monitor apparatus.

According to aspect 6 of the present invention, in the electronic mirror system according to aspect 4, the movable portion includes a rotator which is able to rotate the display with a rotating axis extending in a direction along a surface of a component attached to the monitor apparatus.

According to aspect 7 of the present invention, an automobile door wherein a monitor apparatus of the electronic mirror system according to aspect 1 is provided on a wall on an inner side of a passenger compartment of an automobile.

According to aspect 8 of the present invention, the automobile door according to aspect 7 further includes a concave portion on the wall, wherein the concave portion is able to store the monitor apparatus.

According to aspect 9 of the present invention, the automobile door according to aspect 7 further includes a casing which stores the display, wherein, the rotator can be folded so that the display surface faces the wall side, and the back surface of the casing has an outer appearance the same as or similar to the wall.

According to aspect 10 of the present invention, an automobile wherein a monitor apparatus of an electronic mirror system according to aspect 1 is provided in an edge of an instrument panel.

According to aspect 11 of the present invention, an automobile includes an automobile door according to aspect 7.

According to aspect 12 of the present invention, the automobile according to aspect 10 or 11 further includes, a monitoring unit to monitor whether a predetermined event occurs diagonally behind a camera of the electronic mirror system, and an alerting unit to direct attention of a passenger to the monitor apparatus of the electronic mirror system in response to the monitoring unit detecting that the predetermined event occurred.

According to aspect 13 of the present invention, the automobile according to aspect 10 or 11 further includes a controlling apparatus which controls the monitor apparatus, wherein, the monitor apparatus can be folded so that the display surface faces the inner side of the passenger compartment of the automobile, and the controlling apparatus displays on the display an image of an outer appearance which is the same as or similar to the wall when the monitor apparatus is folded.

According to aspect 14 of the present invention, the automobile according to claim 10 or 11, further includes a controlling apparatus which controls the monitor apparatus, wherein, the controlling apparatus does not display on the display when the monitor apparatus is folded.

Advantageous Effects of Invention

According to aspect 1 of the present invention, by using the movable portion, the angle of the display can be changed upward, and the height of the display can be made higher than the attaching position of the monitor apparatus. Therefore, even if the attaching position of the monitor apparatus is lower than the conventional side view mirror, it is possible to prevent the visibility decreasing or the burden of the driver increasing. Therefore, the problems which occur by providing the position of the monitor lower than the conventional side view mirror can be overcome.

According to aspect 2 of the present invention, the lift is raised and lowered to move the display up and down, and the display can be raised to the height the same as the conventional side view mirror. With this, it is possible to prevent the decrease of visibility and it is possible to reduce the burden of the driver due to moving the line of view vertically.

According to aspect 3 of the present invention, the space below the display largely opens when the lift extends and the display moves upward. For example, the display does not close the outlet of the air-conditioning in both the left and right edges of the instrument panel and does not interfere with the operation of the operating buttons to operate open/close of the windows provided in the door.

According to aspect 4 of the present invention, the display surface can face upward, and therefore, the display surface hardly becomes diagonal with relation to the line of view, and the decrease in the visibility can be prevented.

According to aspects 5 and 6 of the present invention, the display can be folded to be along the surface of the component where the display surface is attached when the display is not used. Therefore, the display does not interfere with the passenger getting on and off.

According to aspect 7 of the present invention, it is possible to provide an electronic mirror system which does not interfere with the operation of the airbag apparatus and the outlet of the wind of the air-conditioning, and which has high visibility.

According to aspect 8 of the present invention, it is possible to prevent the monitor apparatus from projecting from the wall in the amount of the depth of the concave portion. Specifically, if the thickness of the monitor apparatus is equal to or smaller than the depth of the concave portion, the monitor apparatus when stored can be aligned in the same plane as the wall of the door, and the beauty of the outer appearance of the automobile door is not lost.

According to aspect 9 of the present invention, a feeling of unity can be achieved between the back surface of the monitor apparatus and the wall of the door. Therefore, the beauty of the outer appearance of the door when the monitor apparatus is folded is not lost.

According to aspect 10 of the present invention, the monitor apparatus is positioned in a comparatively high position. Therefore, there is no need for a means to raise the display, and the electronic mirror system can have a simple configuration.

The member does not move largely, and it is possible to reduce the risk of breakdown of the monitor apparatus due to shaking.

According to aspect 11 of the present invention, there is no need to change the design of the components on the automobile main body side such as the instrumental panel. Therefore, the electronic mirror system can be easily provided.

According to aspect 12 of the present invention, the light emitter emits light if a predetermined event occurs. Therefore, the attention of the passengers such as the driver is directed to the display of the monitor apparatus and it is possible to take measures such as to avoid other automobiles which are approaching if necessary.

According to aspect 13 of the present invention, even if the monitor apparatus is folded and the display faces the passenger compartment, the display appears to be as one with the surrounding wall and the beauty of the outer appearance is not lost.

According to aspect 14 of the present invention, when the monitor apparatus is folded, that is, when the monitor apparatus is not used, the image is not displayed. Therefore, it is possible to prevent unnecessary power consumption.

DESCRIPTION OF EMBODIMENTS

First Embodiment

Figure 1:
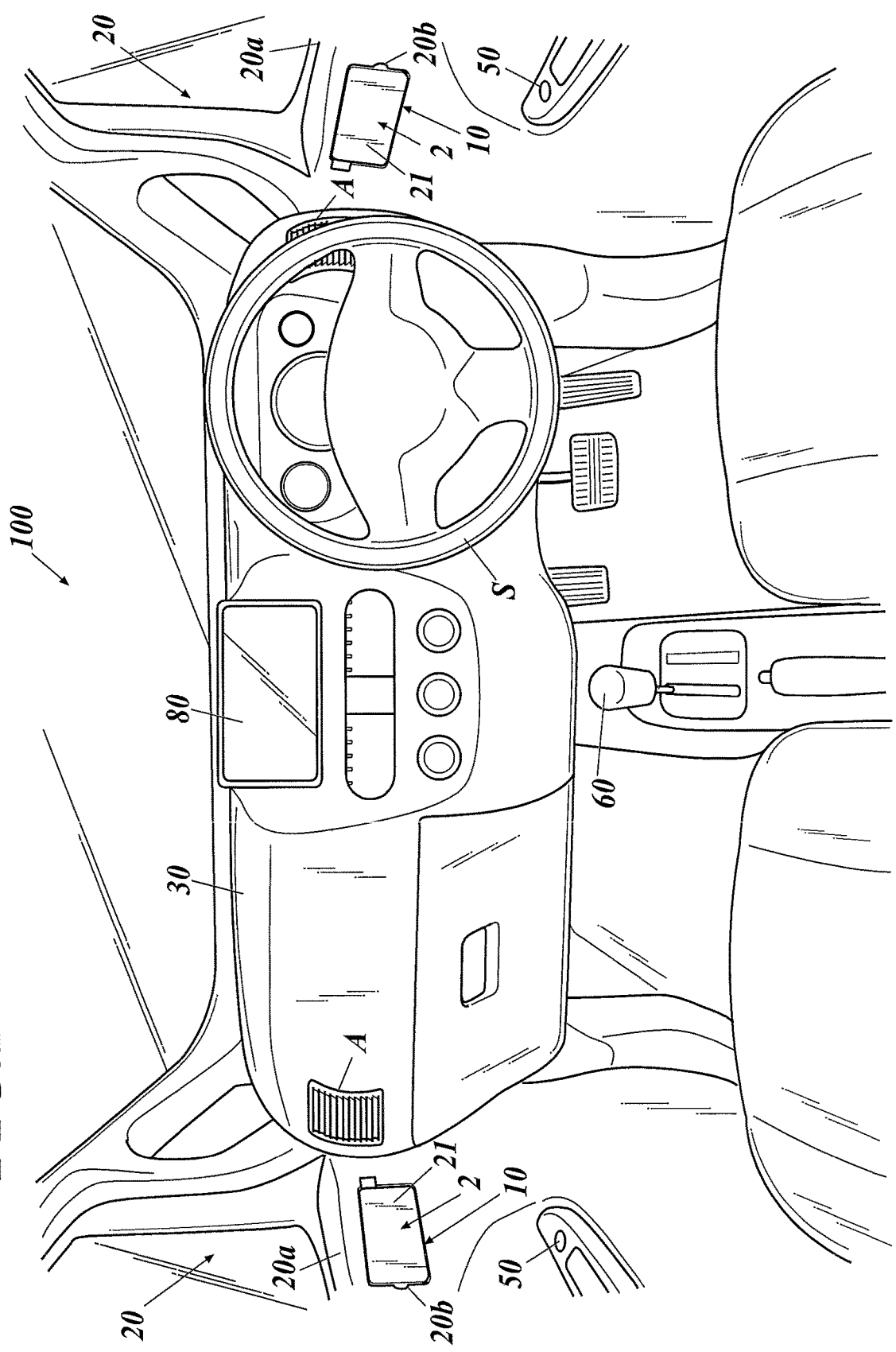
FIG. 1 is a schematic view showing a passenger compartment of an automobile viewed from the rear according to a first embodiment of the present invention.

First, the schematic configuration of an automobile according to a first embodiment of the present invention is described. FIG. 1 is a schematic diagram of a passenger compartment of the automobile 100 viewed from the rear.

FIG. 1 shows a passenger car, but the present invention can also be applied to a large automobile such as a bus or a truck. FIG. 1 illustrates an automobile with the steering wheel on the right side, but the present invention can be applied to an automobile with the steering wheel on the left side or an automobile for one person without a passenger front seat (an automobile in which there is no discrimination of the steering wheel being on the left side or the right side).

The automobile 100 according to the present embodiment is called a mirrorless automobile. That is, the automobile is not provided with a side view mirror (also called a door mirror or a fender mirror) which shows diagonally behind, and instead an electronic mirror system 10 is provided.

The structures other than the electronic mirror system 10 provided in the automobile 100 is the same as conventional automobiles, and therefore, the description is omitted.

The electronic mirror system 10 includes a camera (see FIG. 3) and a monitor apparatus 2.

The camera 1 is able to image a moving image, and is attached to the side outside of the automobile 100 (for example, the fender or the door), so as to be able to image diagonally behind the automobile 100.

The angle imaged by the camera 1 can be adjusted based on the operation by the switch 50 provided in the passenger compartment.

The data of the imaged moving image is transmitted to the monitor apparatus 2 through a control apparatus 40 (see FIG. 3) provided in the automobile 100.

The monitor apparatus 2 displays the moving image imaged by the camera 1, and according to the present embodiment, the monitor apparatus 2 is provided on a wall on an inner side of a door 20 provided on both the left and right sides of the driver's seat as shown in FIG. 1. More specifically, the monitor apparatus 2 is provided in a front upper portion of a door lining 20a (portion near an instrument panel 30). According to the above, there is no need to change the design of the components such as the instrument panel 30 provided on the automobile 100 main body side. Therefore, the electronic mirror system 10 can be easily provided.

A concave portion 20b is formed in the door lining 20a, and the monitor apparatus 2 can be stored in the concave portion 20b.

Figure 2A:
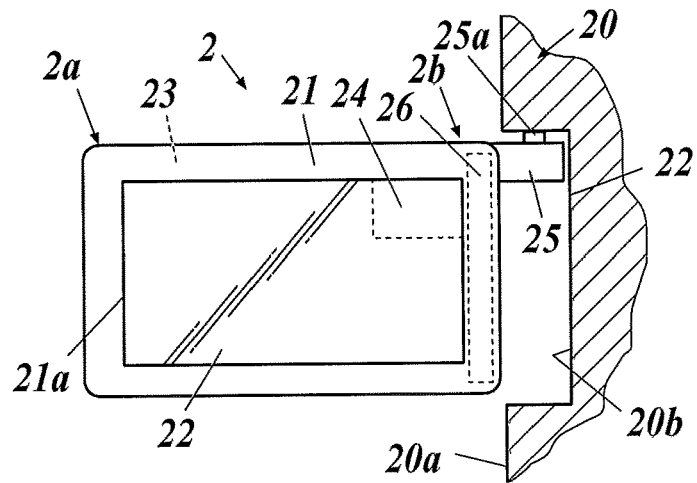
FIG. 2A is a vertical cross-sectional view of a door included in an automobile shown in FIG. 1.
Figure 2B:
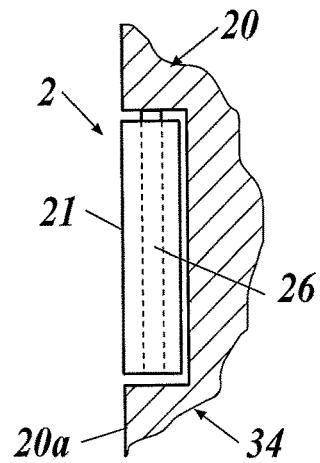
FIG. 2B is a vertical cross-sectional view of a door included in an automobile shown in FIG. 1.
Figure 2C:
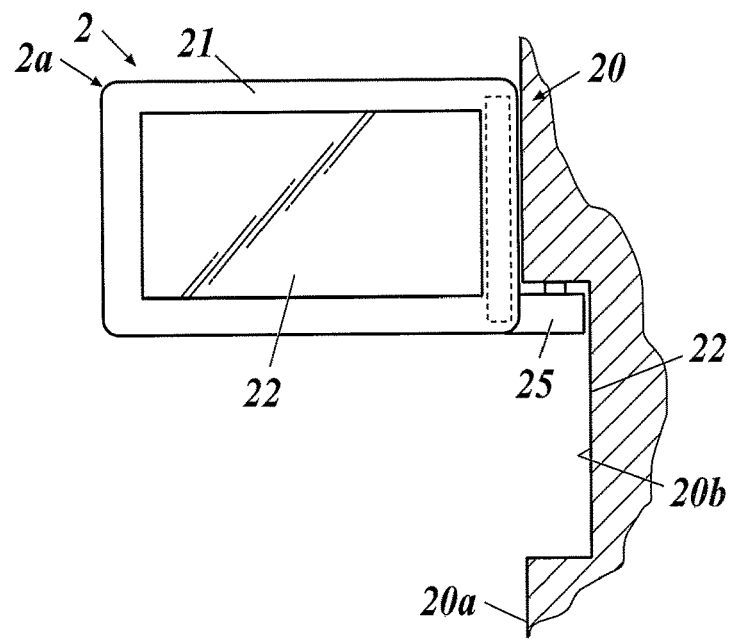
FIG. 2C is a vertical cross-sectional view of a door included in an automobile shown in FIG. 1.

Next, the details of the monitor apparatus 2 provided in the automobile 100 is described. FIG. 2A to FIG. 2C are vertical cross-sections of the door 20 included in the automobile 100.

As shown in FIG. 2A, the monitor apparatus 2 includes a monitor main body 2a and a movable portion 2b. The monitor main body 2a includes a casing 21, a display 22, and a light emitter 23.

The casing 21 is formed in a rectangular box including a thickness equal to or smaller than a depth of a concave portion 20b of the door 20. An opening 21a is formed in a front surface of the casing 21.

At least the back surface of the casing 21 is covered with an outer material with the same or similar material as the door lining.

The display 22 is stored in the casing 21 and a display surface is exposed from the opening 21a of the casing 21. The display 22 is not limited if a moving image can be displayed, but preferably, the display 22 is a component as thin as possible, for example, a liquid crystal display or an organic EL display. With this, the monitor apparatus 2 can be made thinner, and consequently, it is possible to prevent the door storing the monitor apparatus 2 from becoming thick. Specifically, the organic EL display is preferable from the view point of safety because compared to a liquid crystal display, a delay in display hardly occurs in a low temperature atmosphere.

The light emitter 23 is provided in the casing 21 around the display 22. If the light emitter 23 emits light, at least a portion surrounding the display 22 in the casing 21 shines brightly.

The movable portion 2b is provided to be able to move the monitor main body 2a with relation to the door lining 20a.

The movable portion 2b according to the present embodiment includes an angle adjuster 24, a rotator 25 and a lift 26.

The angle adjuster 24 is provided to change the angle of the display surface of the display 22 with relation to the movable portion 2b or the front surface of the casing 21. The angle adjuster 24 is provided in the casing 21 behind the display 22. A conventional mechanism to adjust the angle of a mirror surface of the side view mirror as described in JP 4649831 can be used as the specific mechanism of the angle adjuster 24.

According to the present embodiment, the rotator 25 is provided so as to project from the side the monitor main body 2a. The rotating axis 25a extending in a vertical direction (direction along the door lining 20a) is supported by the door 20 and the monitor apparatus 2 is attached to the door 20. That is, the rotator 25 functions as the attaching portion of the present invention. A conventional mechanism to rotate the side view mirror as described in JP 3729944 can be used as the specific mechanism of the rotator 25.

The monitor main body 2a is rotated with the rotating axis 25a, and with this, the monitor main body 2a can be set standing as shown in FIG. 2A or FIG. 2C in use or can be set folded as shown in FIG. 2B when not used (stored in the concave portion 20b). According to the present embodiment, when the monitor main body 2a is not used, the display surface faces the door lining 20a side.

The rotator 25 does not have to project from the side of the monitor main body 2a, and can be provided in the casing 21 or the door 20.

The lift 26 is provided in the edge toward the rotating portion 25 of the casing 21, that is, between the rotating portion 25 and the display 22, and the lift 26 is able to raise and lower the monitor main body 2a. The specific mechanism of the lift is not limited and can slide with relation to the rotator 25 or can expand and contract between the angle adjuster 24 and the rotator 25.

The distance between the monitor main body 2a and the rotator 25 may change by the lift 26. Therefore, the lines connected to the monitor main body 2a from the door 20 is provided to be long with allowance in the casing 21 or the door 20 in order to be long enough for when the monitor main body 2a is raised the highest.

Figure 3:
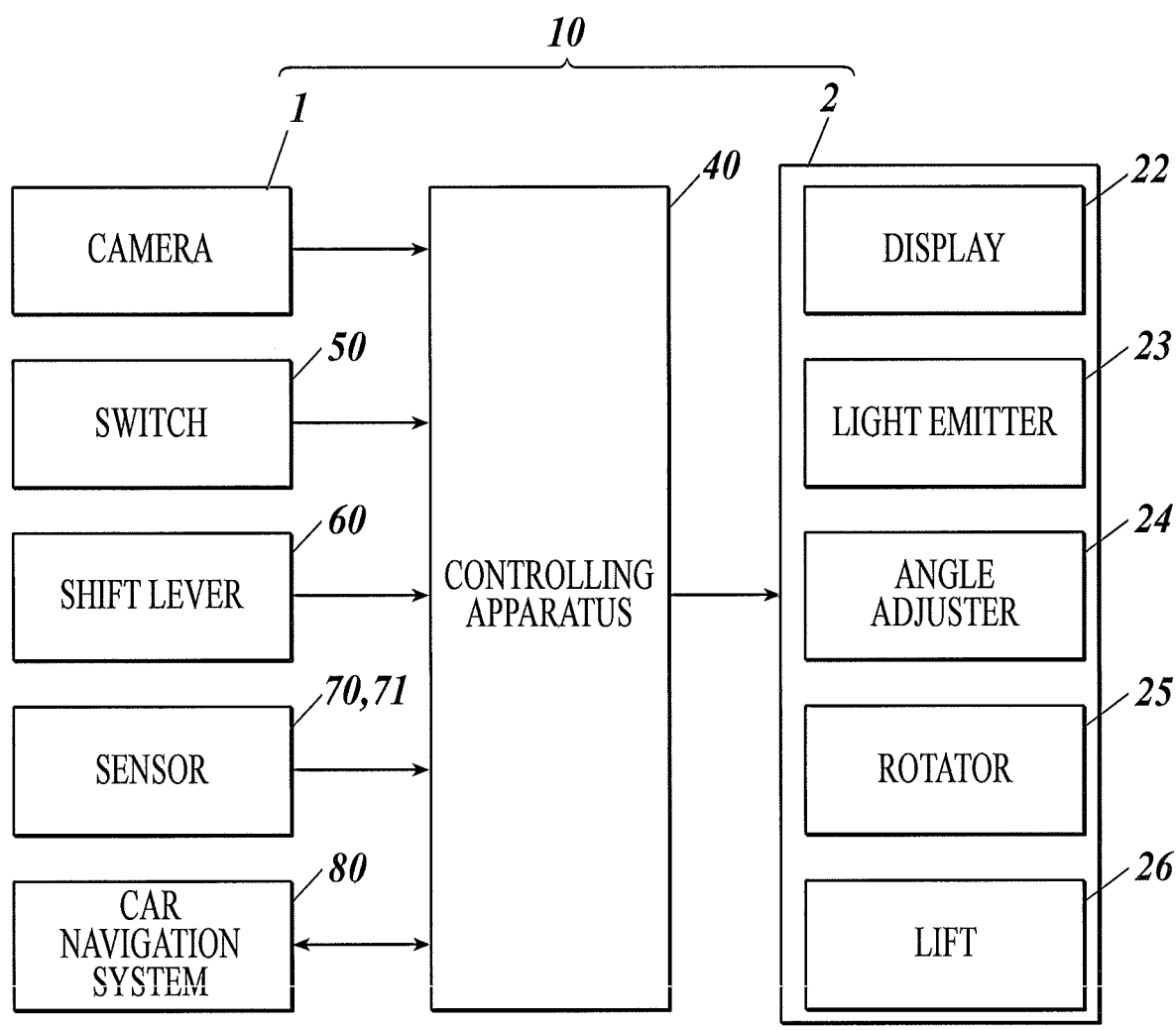
FIG. 3 is a block diagram showing an electric configuration provided in the automobile shown in FIG. 1.

Next, an electric configuration of the automobile 100 is described. FIG. 3 is a block diagram showing an electric configuration provided in the automobile 100.

As shown in FIG. 3, the automobile 100 includes a controlling apparatus 40. In addition to the electronic mirror system 10, the controller 40 is connected to a switch 50, a shift lever 60, various sensors 70 and 71, and a car navigation system 80, and the controller apparatus 40 controls such devices.

Specifically, in response to the shift lever 60 being switched to a mode in which driving is possible, the switch 50 being operated, or the sensor 70 provided in the seat detecting the driver sitting in the seat, the controlling apparatus 40 controls the rotator 25 to operate in the direction that the monitor main body 2a comes out from the concave portion 20b, and then the controlling apparatus 40 controls the lift 26 to raise the monitor main body 2a. Instead of the monitor main body 2a being raised automatically, the monitor main body 2a can be raised in response to an operation of the switch 50.

When the operation of the rotator 25 and the lift 26 ends, the controlling apparatus 40 instructs the start of imaging to the camera 1 and receives moving image data from the camera 1. The received moving image data is transferred to the display 22. The moving image data is transferred after performing the necessary image processes (process to make the image brighter, etc.).

If the operation of the switch 50 is detected, the controlling apparatus 40 controls the angle adjuster 24 so that the angle of the display surface of the display 22 is an angle according to the operation of the switch 50.

In response to the shift lever 60 being switched to a mode in which driving is not possible, the switch 50 being operated, or the sensor 70 of the seat detecting that the driver left the seat, the controlling apparatus 40 instructs the monitor main body 2a to stop the operation, and controls the lift 26 to lower the monitor main body 2a. Then, the controlling apparatus 40 controls the rotator 25 to move the monitor apparatus 2 in the direction to place the monitor apparatus 2 in the concave portion 20b. According to the above, it is possible to suppress unnecessary power consumption when the monitor apparatus 2 is not used.

If the sensor 71 attached to the outside of the automobile 100 detects that an object is coming close to the automobile 100 at a predetermined speed or more (predetermined event), the controlling apparatus 40 turns on the light emitter of the monitor apparatus 2. That is, the controlling apparatus 40 functions as a monitoring unit of the present invention.

The approach can be detected based on the change in the size of the object appearing in the imaged moving image. Other events can be monitored, examples including something being sandwiched between the door.

The controlling apparatus 40 monitors the operation of the display 22, and if the controlling apparatus 40 determines that the display 22 cannot display correctly, the controlling apparatus 40 switches the destination of transferring the moving image from the display 22 to another display apparatus (the other monitor apparatus 2 or the car navigation system 80).

The controlling apparatus 40 monitors the operation of the camera 1, and if the controlling apparatus 40 determines that the imaging is not performed normally, the controlling apparatus 40 notifies that the electronic mirror system 10 is not functioning or instructs the use of other units (provided emergency mirror).

If the driver is not riding the automobile 100 according to the present embodiment or the automobile 100 is parked, the monitor apparatus 2 is stored in the concave portion 20b as shown in FIG. 1. Therefore, the monitor apparatus 2 does not interfere with the driver getting on and off the automobile 100.

As described above, the casing 21 of the monitor apparatus 2 has a thickness equal to or smaller than the depth of the concave portion 20b. Therefore, the casing 21 can be stored so that the back surface of the casing 21 is aligned as a flat surface with the door lining 20a, and the unevenness of the door 20 can be made smaller.

As described above, the back surface of the casing 21 is covered with the same or similar outer material as the door lining 20a, and therefore a sense of unity can be seen between the back surface of the casing 21 and the door lining 20a. With this, the monitor apparatus 2 does not have a negative influence on the beauty of the outer appearance of the door 20 when the monitor apparatus 2 is stored.

Figure 4:
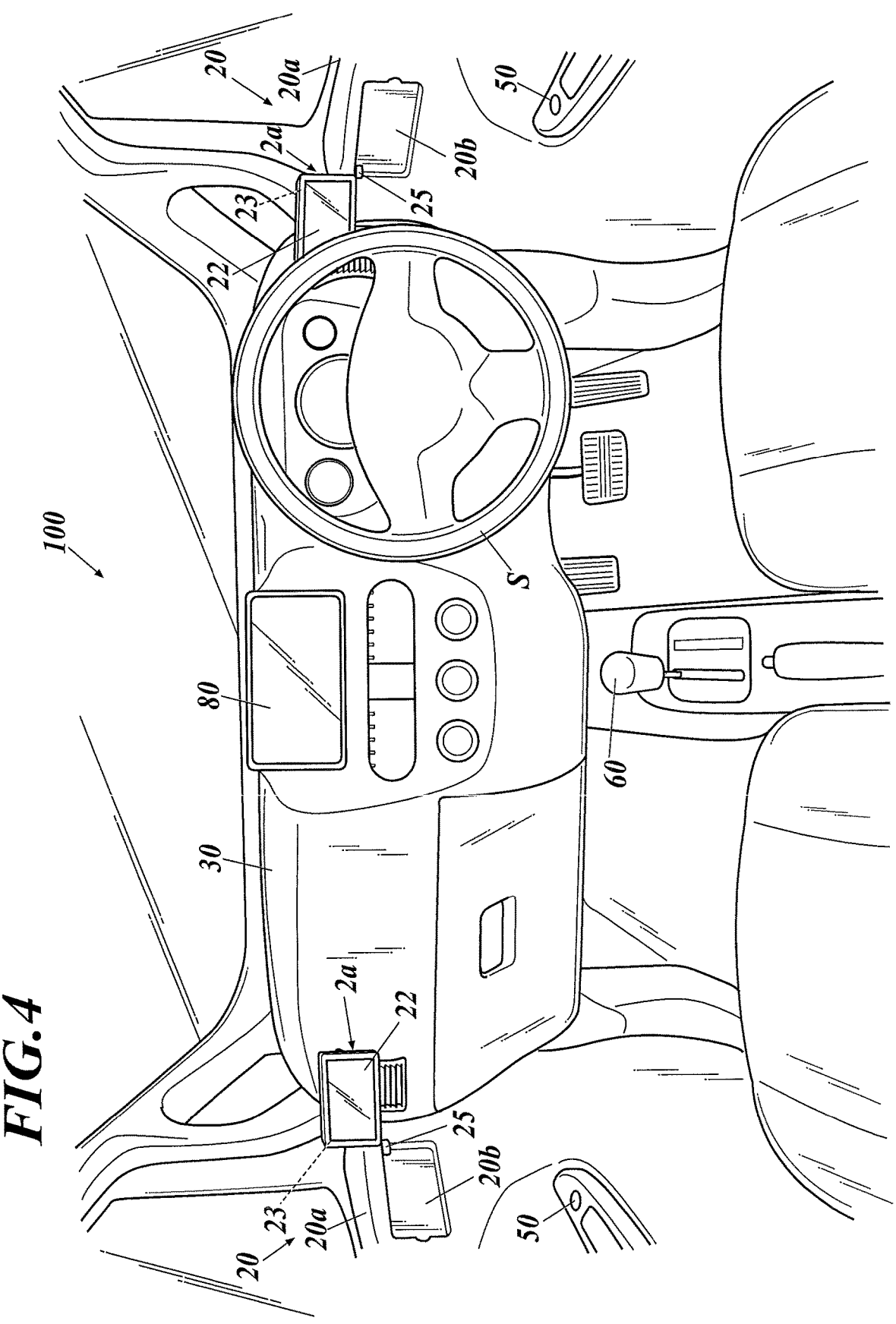
FIG. 4 is a schematic diagram of the passenger compartment of the automobile shown in FIG. 1 viewed from the rear.

If the automobile 100 can be driven, as shown in FIG. 4, the monitor main body 2a is raised so that the display 22 faces the direction of the driver.

If only the rotator 25 is rotated, the display 22 becomes very low. A portion of the display 22 may interfere with the steering wheel and the visibility may be low. The lift 26 raises the monitor main body 2a and the visibility is enhanced.

If the position of the monitor main body 2a is low, the switch 50 of the door 20 may become difficult to operate. Since the monitor main body 2a is raised, such problems do not occur.

While the automobile 100 is running, if another automobile makes a fast approach to the automobile 100 from the rear, the light emitter 23 emits light. Therefore, the attention of the passengers such as the driver is directed to the display 22 of the monitor apparatus 2. If necessary, it is possible to take measures such as to avoid the approaching other automobile. That is, the light emitter 23 functions as the alerting unit of the present invention.

(Modification 1)

Figure 5:
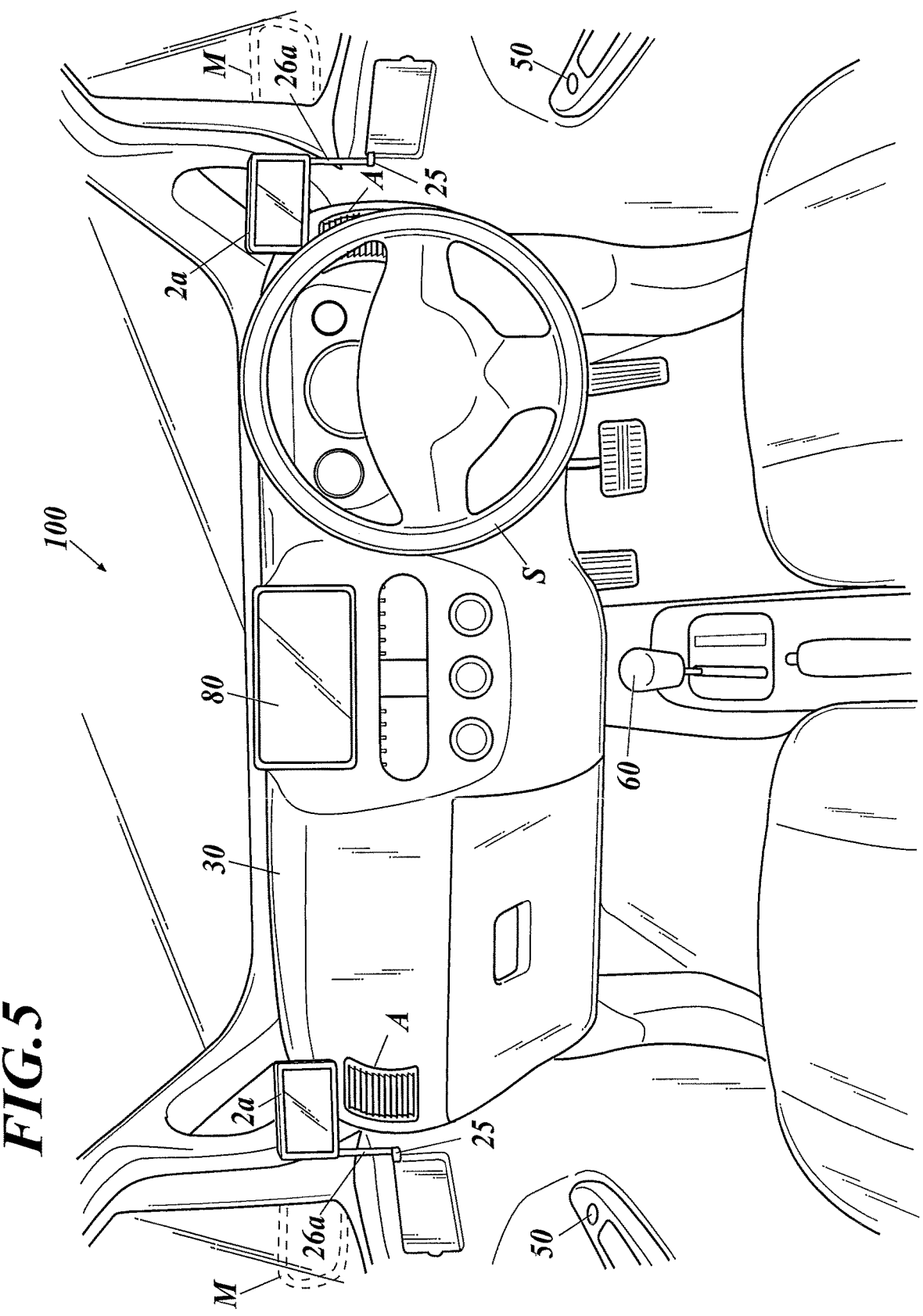
FIG. 5 is a schematic diagram of the passenger compartment of the automobile according to a modification of the embodiment viewed from the rear.

According to the above embodiment, the monitor main body 2a merely slides with relation to the movable portion 2b. Therefore, the height that the monitor main body 2a rises is merely the height of the monitor main body. However, as shown in FIG. 5, the lift 26 may be provided with a supporting member 26a which may appear and disappear freely from the casing 21. After the monitor main body 2a is raised, the supporting member 26a may be projected to raise the monitor main body 2a even higher.

According to the above, the display 22 is positioned in the height the same as the conventional side view mirror M shown with the broken lines. Therefore, the driver does not have to move the line of view vertically when viewing the display 22. Further, the supporting member 26a passes near the door 20 (side of the passenger compartment in the left and right direction). Therefore, the space below the monitor main body 2a is largely opened, and an outlet A of the air-conditioning is not closed.

(Modification 2)

Figure 6:
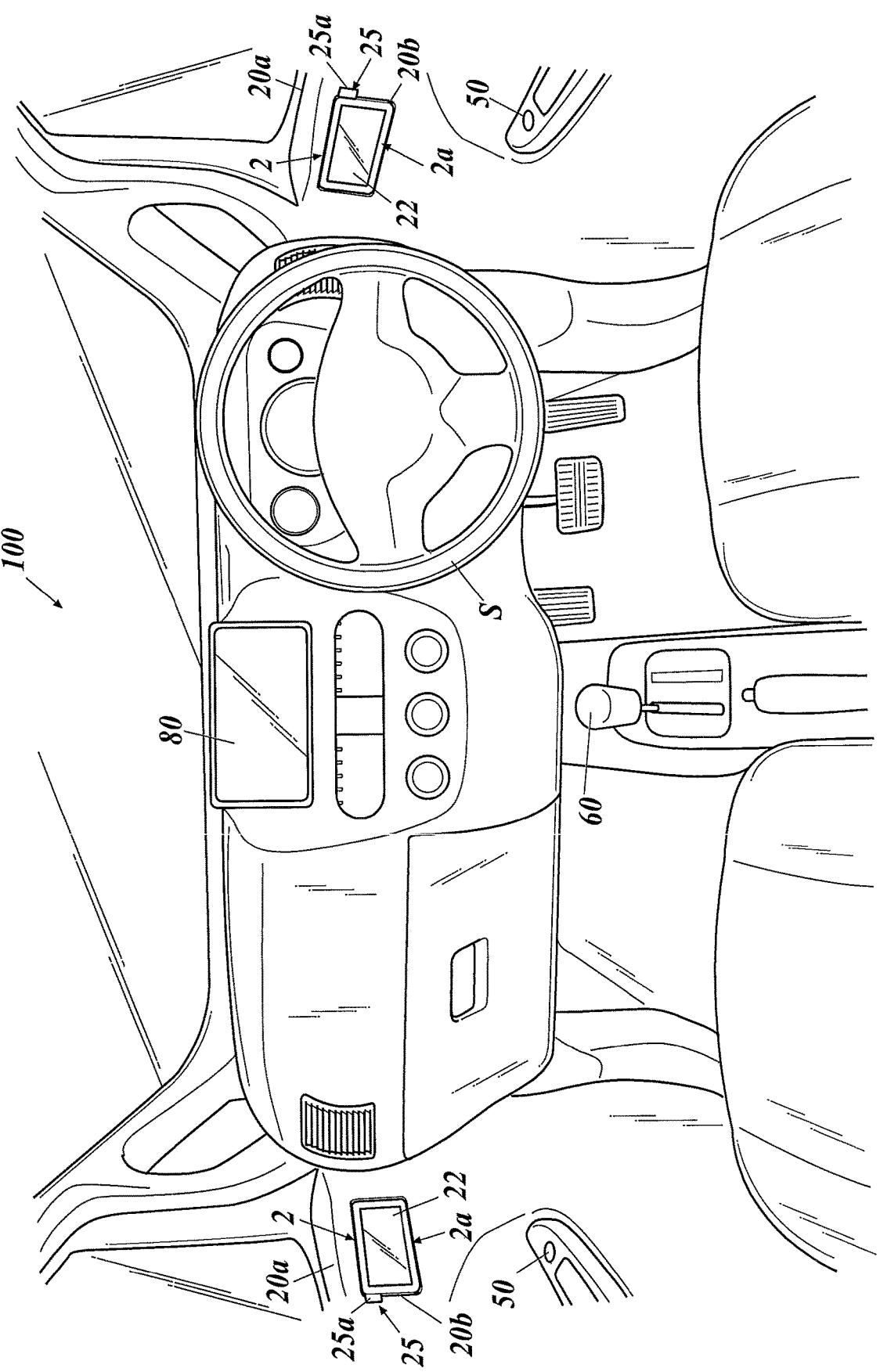
FIG. 6 is a schematic diagram of the passenger compartment of the automobile according to a modification of the embodiment viewed from the rear.

According to the above embodiment, the display 22 is hidden when stored. However, as shown in FIG. 6, the display 22 may face the passenger compartment side when stored, and the image other than the moving image imaged by the camera 1 may be displayed on the display 22 when stored. For example, here, if the image which is the same as or similar to the outer material of the door lining 20a is displayed, even if the monitor apparatus 2 is folded and the display 22 faces the passenger compartment, the display 22 may appear as to be as one with the surrounding door lining 20a, and there is no damage to the beauty of the outer appearance.

When the monitor main body 2a is stored, at least the driving by the driver is not necessary (including automatic driving). Therefore, the monitor apparatus 2 can be used as a television or a player for various media.

According to the present modification, the rotating axis 25a of the rotator 25 is provided in the edge of the concave portion 20b toward the driver. Therefore, in order to prevent the casing 21 coming into contact with the steering wheel S or to prevent the passenger from receiving a feeling of pressure, the movable portion 2b may be provided with a sliding portion to slide the monitor main body 2a in the front and back direction. Preferably, when the monitor main body 2a is standing, the monitor main body 2a is moved forward.

(Modification 3)

Figure 7:
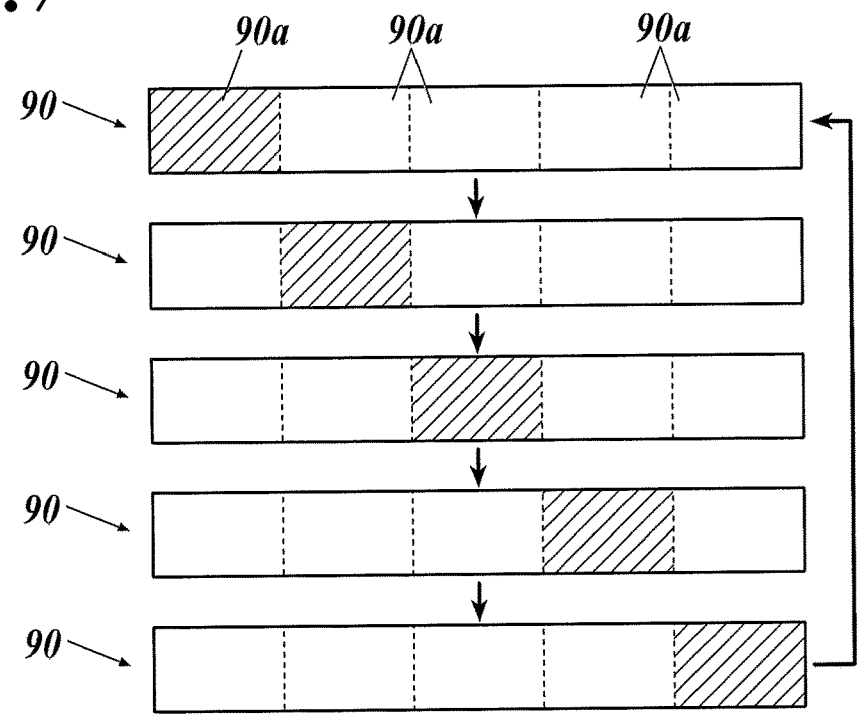
FIG. 7 is a front view of a light emitter using a modification according to the present embodiment.
Figure 8:
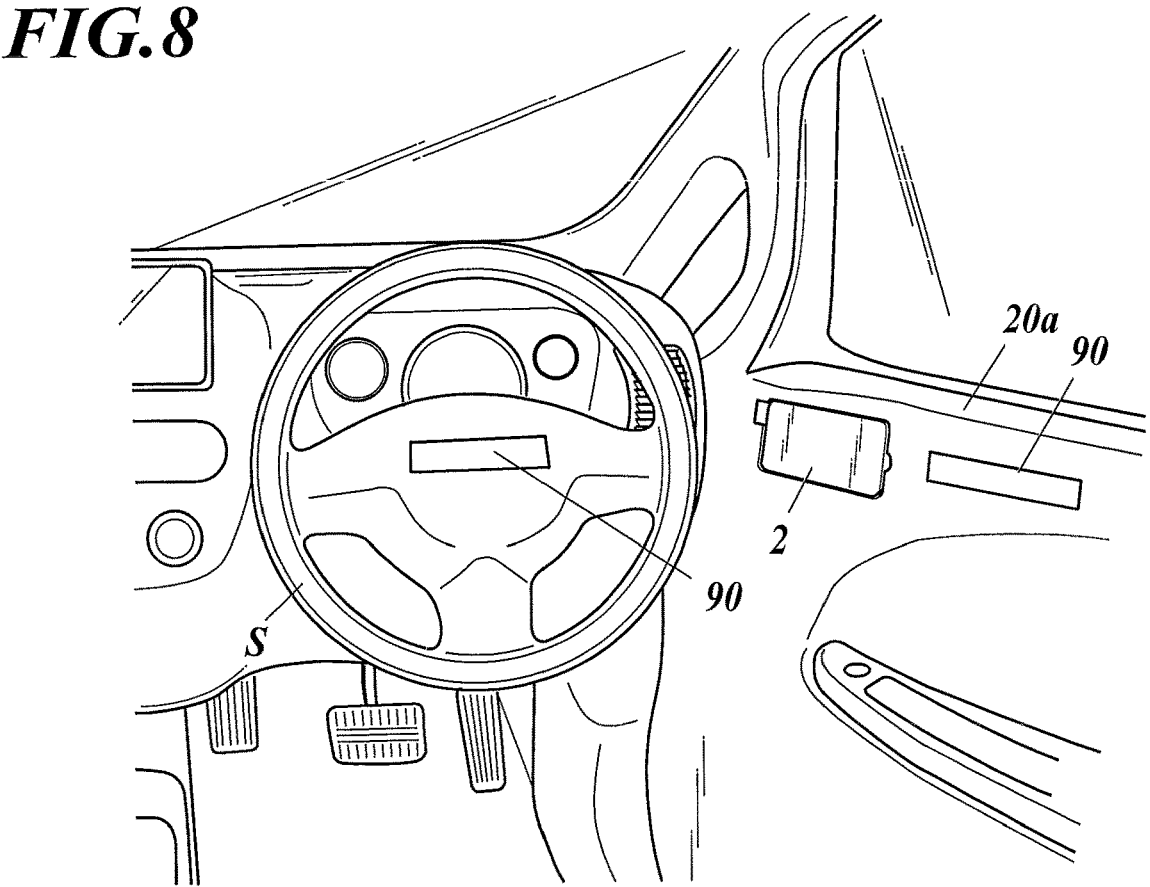
FIG. 8 is a schematic view of the passenger compartment of the automobile according to a modification of the embodiment viewed from the rear.

According to the above embodiment, the casing 21 is provided with a light emitter 23 and the surrounding edges of the casing 21 emits light to direct the attention of the passengers to the display 22. Alternatively, as shown in FIG. 7, a plurality of light emitting regions 90a may be aligned in one line, and a light emitting unit 90 which successively moves the light emitting regions 90a may be provided in the steering wheel S or in the door lining 20a near the monitor apparatus 2 so that the moving direction of the light emitting regions 90a point the display 22 of the monitor apparatus 2 as shown in FIG. 8.

As described above, the electronic mirror system 10 according to the present embodiment is provided with the portable portion 2b so that the display 22 on which the moving image is displayed can be moved by the monitor apparatus 2 with relation to the door lining 20a (wall on which the monitor apparatus is attached in the passenger compartment).

According to the above, by using the movable portion 2b, the angle of the display 22 can be changed to face upward and the height of the display 22 can be made higher than the position where the monitor apparatus 2 is attached. Therefore, even if the position where the monitor apparatus 2 is attached is lower than the conventional side view mirror M, it is possible to prevent the visibility decreasing or the burden of the driver increasing.

In the electronic mirror system 10 according to the present embodiment, the movable portion 2b is provided with a lift 26 which is provided between the rotator 25 (attaching portion) attached to the door lining 20a (wall) and the display 22, and which raises and lowers the display 22.

Since the lift 26 moves up and down, the display 22 moves up and down. Therefore, the display 22 can be raised to the height the same as the conventional side mirror M. Consequently, the decrease in the visibility can be prevented and the burden of the driver due to moving the line of view vertically can be decreased.

In the electronic mirror system 10 according to the present embodiment, the lift 26 is provided between the door lining 20a (side of the passenger compartment in the left and right direction) and the edge in the display 22 toward the door lining 20a in the passenger compartment in the left and right direction.

With this, if the lift 26 extends and the display 22 moves upward, the space below the display 22 largely opens. Therefore, for example, the outlets A of the air-conditioning in both the left and right edges of the instrument panel 30A are not closed, and the display 22 does not interfere with the operation of the switch 50 provided in the door 20.

The electronic mirror system 10 according to the present embodiment is provided with an angle adjuster 24 so that the movable portion 2b is able to change the angle of the display surface of the display 22 with relation to the movable portion 2b and the front surface of the casing 21.

With this, the display surface can be faced upwards, the display surface hardly becomes diagonal with relation to the line of view, and it is possible to prevent decrease in visibility.

The electronic mirror system 10 according to the present embodiment includes a rotator 25 so that the movable portion 2b is able to rotate the display 22 with the rotating axis 25a extending in the direction along the surface of the door lining 20a.

With this, when the monitor apparatus 2 is not used, the monitor apparatus 2 can be folded so that the display surface is along the surface of the door lining 20a. With this, the monitor apparatus 2 does not interfere with the passenger getting on and off.

Second Embodiment

Figure 9:
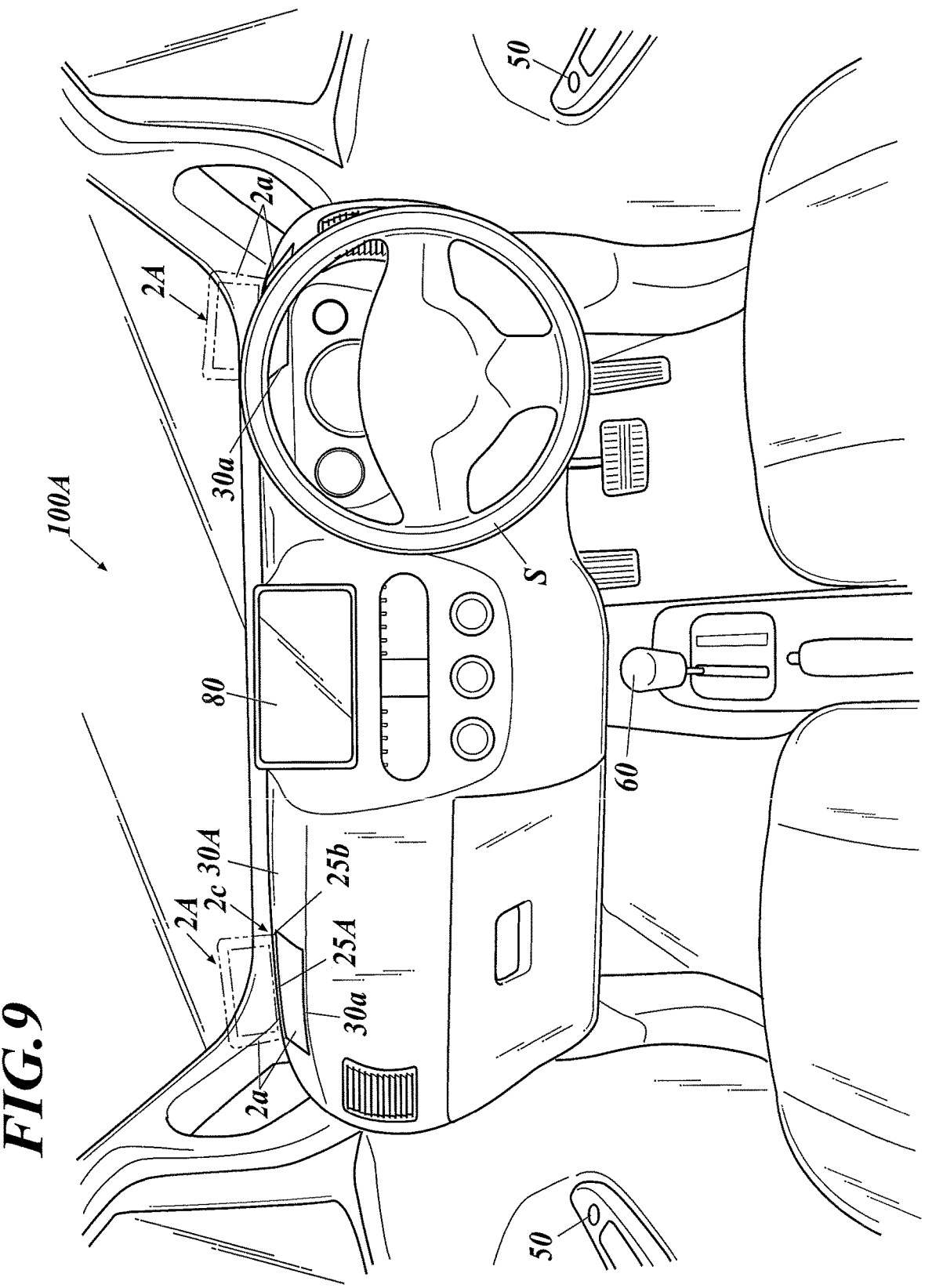
FIG. 9 is a schematic view of the passenger compartment of the automobile viewed from the rear according to the second embodiment of the present invention.

Next, the second embodiment of the present invention is described. FIG. 9 is a schematic diagram when the passenger compartment of the automobile 100A according to the present embodiment is viewed from the rear.

The automobile 100 according to the first embodiment is provided with the monitor apparatus 2 in the door 20. The automobile 100A according to the present embodiment is different from the first embodiment in that the monitor apparatus 2A is provided in both the left and right edges of the instrument panel 30A.

Specifically, the instrument panel 30A according to the present embodiment includes a concave portion 30a storing the monitor apparatus 2 in both the left and right edges.

A movable portion 2c in the monitor apparatus 2A is different from the first embodiment. In the movable portion 2c according to the present embodiment, the rotator 25A rotates the monitor main body 2a with the rotating axis 25b extending in the horizontal direction (direction along the instrument panel 30A). With this, the monitor main body 2a can be folded to the state not in use as shown with the solid lines in FIG. 9 (stored in the concave portion 30a) or can be set to stand to the state in use as shown with the broken lines in FIG. 9.

According to the present embodiment, the monitor apparatus 2A is provided in the position higher than the door lining 20a and the necessity to raise the monitor apparatus 2A is low. Therefore, the movable portion 2c does not include the configuration corresponding to the lift 26 of the first embodiment.

According to the above, compared to the first embodiment, the configuration of the monitor apparatus 2 becomes simple.

Different from the door 20, etc., the instrument panel 30A is a component which does not move greatly. Therefore, it is possible to reduce the risk of breakdown of the monitor apparatus 2A due to shaking.

The present invention is described according to the embodiment, and the present invention is not limited to the embodiment and various modifications are possible.

For example, according to the above embodiment, the pair of monitor apparatuses 2 are provided in the left and right doors 20 or the left and right edges of the instrument panel 30. Alternatively, only one monitor apparatus 2 may be provided, and the display region of the display 22 may be divided between left and right, and the moving images of the two cameras 1 may be displayed in the left and right display regions.

According to the present embodiment, when the monitor apparatus 2 breaks down, the moving image is displayed on the other monitor apparatus 2 or the car navigation system 80. Alternatively, an emergency side view mirror can be provided and when the monitor apparatus 2 breaks down, the emergency side view mirror can be attached.

According to the present embodiment, the movable portion includes a motor, etc., and the rotation and elevation is performed automatically. Alternatively, such operation can be performed manually by the passenger.

INDUSTRIAL APPLICABILITY

The present invention can be used in an automobile door and an automobile.

REFERENCE SIGNS LIST 100, 100A automobile
10 electronic mirror system
1 camera
2, 2A monitor apparatus
2a monitor main body
21 casing
21a opening
22 display
23 light emitter (alerting unit)
2b, 2c movable portion
24 angle adjuster
25, 25A rotator
25a, 25b rotating axis
26 lift
26a supporting member
20 door
20a door lining (wall where monitor apparatus is attached)
20b concave portion
30, 30A instrument panel
30a concave portion
40 controlling apparatus (monitoring unit, alerting unit)
50 switch
60 shift lever
70, 71 sensor (monitoring unit)
80 car navigation system
90 light emitting unit (alerting unit)
90a light emitting region
A outlet
M side view mirror
S steering wheel

The invention claimed is:

1. An automobile door comprising:
an electronic mirror system comprising:
a camera configured to be attached to a side of an automobile and image a moving image diagonally behind the automobile;
a monitor apparatus configured to be attached in a passenger compartment of the automobile and display the moving image imaged by the camera on a display;
a wall on the door on an inner side of the passenger compartment, the monitor apparatus being attached to the wall;
a movable portion of the monitor apparatus configured to move the display in relation to the wall, the movable portion including a rotator having a rotating axis supported by the door; and
a controlling apparatus connected to a shift lever, the controlling apparatus being configured to:
when the controlling apparatus detects that the shift lever is switched to a mode in which driving is possible, control the movable portion to move the display in a direction in which the display faces a direction of the driver; and
after the controlling apparatus detects that the shift lever is switched to a mode in which driving is not possible, control the movable portion so that a monitor main body of the monitor apparatus is rotated with the rotating axis and is folded and stored in the door.

2. The automobile door according to claim 1, wherein when an operation of the movable portion to move the display in the direction in which the display faces the direction of the driver ends, the controlling apparatus is configured to instruct the camera to start imaging, receive moving image data from the camera, and transfer the received moving image data to the display.

3. The automobile door according to claim 2, wherein, the movable portion further includes an angle adjuster and a lift, and
the controlling apparatus is configured to control an operation switch configured to adjust an angle of the angle adjuster and the rotator.

4. The automobile door according to claim 1, wherein when the controlling apparatus detects that the shift lever is switched to the mode in which driving is not possible, the controlling apparatus instructs the monitor main body to stop operation.

5. An automobile door comprising:
an electronic mirror system comprising:
a camera configured to be attached to a side of an automobile and image a moving image diagonally behind the automobile;
a monitor apparatus configured to be attached in a passenger compartment of the automobile and display the moving image imaged by the camera on a display;
a wall on an inner side of the passenger compartment, the monitor apparatus being attached to the wall;
a movable portion of the monitor apparatus configured to move the display in relation to the wall;
a sensor provided in a seat and configured to detect that a driver is seated; and
a controlling apparatus connected to the sensor and a shift lever, the controlling apparatus being configured to:
when the controlling apparatus detects through the sensor that the driver is seated and detects that the driver switched the shift lever to a mode in which driving is possible, control the movable portion to move the display in a direction in which the display faces a direction of the driver.

6. The automobile door according to claim 5, wherein when the sensor detects that the driver left the seat, the controlling apparatus controls the monitor apparatus to place the monitor apparatus in a state that is not in use.

7. The automobile door according to claim 5, wherein when an operation of the movable portion to move the display in the direction in which the display faces the direction of the driver ends, the controlling apparatus is configured to instruct the camera to start imaging, receive moving image data from the camera, and transfer the received moving image data to the display.

8. The automobile door according to claim 7, wherein the movable portion further includes an angle adjuster, a rotator, and a lift, and
the controlling apparatus is configured to control an operation switch configured to adjust an angle of the angle adjuster and the rotator.

9. A method to manufacture the automobile door according to claim 1, the method comprising:
  forming the electronic mirror system by:
    attaching the camera to the side of the automobile so that it is configured to image the moving image diagonally behind the automobile;
    attaching the monitor apparatus in the passenger compartment of the automobile;
    providing the wall on the inner side of the passenger compartment;
    attaching the monitor apparatus to the wall;
    providing the movable portion of the monitor apparatus so that it is configured to move the display in relation to the wall; and
    providing the controlling apparatus so that it is configured to control the movable portion of the monitor apparatus when the driver shifts the automobile to the mode in which driving is possible.

* * * * *